US012639953B2

(12) United States Patent
Tsuruoka et al.

(10) Patent No.: US 12,639,953 B2
(45) Date of Patent: May 26, 2026

(54) PARKING LOT MANAGEMENT SYSTEM, PARKING LOT MANAGEMENT METHOD, AND RECORDING MEDIUM

(71) Applicant: NEC Corporation, Tokyo (JP)

(72) Inventors: Yuki Tsuruoka, Tokyo (JP); Kenichi Asada, Tokyo (JP); Shuta Okada, Tokyo (JP); Akira Tada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/854,657

(22) PCT Filed: May 20, 2022

(86) PCT No.: PCT/JP2022/020943
§ 371 (c)(1),
(2) Date: Oct. 7, 2024

(87) PCT Pub. No.: WO2023/223540
PCT Pub. Date: Nov. 23, 2023

(65) Prior Publication Data
US 2025/0232588 A1 Jul. 17, 2025

(51) Int. Cl.
*G06V 20/52* (2022.01)
*G06V 40/16* (2022.01)
*G06V 40/20* (2022.01)

(52) U.S. Cl.
CPC ............ *G06V 20/52* (2022.01); *G06V 40/172* (2022.01); *G06V 40/25* (2022.01)

(58) Field of Classification Search
CPC ...... G06V 20/52; G06V 40/172; G06V 40/25; G06Q 50/10
See application file for complete search history.

(56) References Cited

U.S. PATENT DOCUMENTS 10,726,723 B1 * 7/2020 Madden ................. G08G 1/148

FOREIGN PATENT DOCUMENTS

| GB | 2536470 A | * | 9/2016 | ............... G08G 1/04 |
| JP | 2003-216775 A | | 7/2003 | |

(Continued)

OTHER PUBLICATIONS

International Search Report for PCT Application No. PCT/JP2022/020943, mailed on Aug. 16, 2022.

(Continued)

*Primary Examiner* — Alazar Tilahun
(74) *Attorney, Agent, or Firm* — Sughrue Mion, PLLC

(57) ABSTRACT

A parking lot management system according to an aspect of the present disclosure includes: at least one memory configured to store instructions; and at least one processor configured to execute the instructions to: determine, based on a predetermined condition, whether a person who has been detected from an image in which a parking lot is imaged is a parking lot user who has come in by vehicle; determine, based on an appearance of the person who has been determined to be the parking lot user, and an appearance of a person who has been detected from an image in which a store area is imaged, whether the parking lot user was detected in the store area; and output information about the parking lot user based on a result of the determination regarding whether the parking lot user was detected in the store area.

15 Claims, 5 Drawing Sheets

(56) References Cited

FOREIGN PATENT DOCUMENTS

| JP | 2006-338479 | A | 12/2006 |
| JP | 2014-232520 | A | 12/2014 |
| JP | 2016-167172 | A | 9/2016 |
| JP | 2019-205035 | A | 11/2019 |
| JP | 2020-030647 | A | 2/2020 |
| JP | 2020-144654 | A | 9/2020 |

OTHER PUBLICATIONS

English translation of Written opinion for PCT Application No. PCT/JP2022/020943, mailed on Aug. 16, 2022.

* cited by examiner

START

DETERMINE WHETHER PERSON DETECTED IN
PARKING LOT IS PARKING LOT USER
WHO HAS COME IN BY VEHICLE    S1

DETERMINE WHETHER PARKING LOT USER
WHO HAS COME IN BY VEHICLE WAS DETECTED IN
STORE AREA    S2

OUTPUT INFORMATION ABOUT PARKING LOT USER    S3

END

PARKING LOT MANAGEMENT SYSTEM, PARKING LOT MANAGEMENT METHOD, AND RECORDING MEDIUM

This application is a National Stage Entry of PCT/JP2022/020943 filed on May 20, 2022, the contents of all of which are incorporated herein by reference, in their entirety.

TECHNICAL FIELD

The present disclosure relates to a parking lot management system and the like.

BACKGROUND ART

A parking lot may be provided in the store. Some of such parking lots can be used for free for store users. Even in a pay parking lot, a discount may be provided to a user of the store.

PTL 1 discloses a visitor detection system that detects a visitor to a store and notifies the visitor of information of a group. The visitor detection system of PTL 1 detects the group's visit from the face images of the constituent members of the group registered in the monitoring target database and face images captured by the outside camera or the inside camera.

CITATION LIST

Patent Literature

PTL 1: JP 2020-030647 A

SUMMARY OF INVENTION

Technical Problem

A store has a need to grasp whether a user of a parking lot is using the store.

An object of the present disclosure is to provide a parking lot management system or the like that makes it easy to grasp whether a user of a parking lot uses a store.

Solution to Problem

A parking lot management system according to the present disclosure includes a first determination means for determining, based on a predetermined condition, whether a person who has been detected from an image in which a parking lot is imaged is a parking lot user who has come in by vehicle, a second determination means for determining, based on an appearance of the person who has been determined to be the parking lot user, and an appearance of a person who has been detected from an image in which a store area is imaged, whether the parking lot user was detected in the store area, and an output means for outputting information about the parking lot user based on a result of the determination regarding whether the parking lot user was detected in the store area.

A parking lot management method according to the present disclosure includes determining, based on a predetermined condition, whether a person who has been detected from an image in which a parking lot is imaged is a parking lot user who has come in by vehicle, determining, based on an appearance of the person who has been determined to be the parking lot user, and an appearance of a person who has been detected from an image in which a store area is imaged, whether the parking lot user was detected in the store area, and outputting information about the parking lot user based on a result of the determination regarding whether the parking lot user was detected in the store area.

A program according to the present disclosure causes a computer to execute the steps of determining, based on a predetermined condition, whether a person who has been detected from an image in which a parking lot is imaged is a parking lot user who has come in by vehicle, determining, based on an appearance of the person who has been determined to be the parking lot user, and an appearance of a person who has been detected from an image in which a store area is imaged, whether the parking lot user was detected in the store area, and outputting information about the parking lot user based on a result of the determination regarding whether the parking lot user was detected in the store area. The program may be stored in a non-transitory computer-readable recording medium.

Advantageous Effects of Invention

According to the present disclosure, it is easy to grasp whether a user of a parking lot is using a store.

EXAMPLE EMBODIMENT

First Example Embodiment

A parking lot management system 100 according to an example embodiment determines whether a parking lot user who has come in a store provided with a parking lot by vehicle is detected in the store area, and performs output according to a result of the determination.

Figure 1:
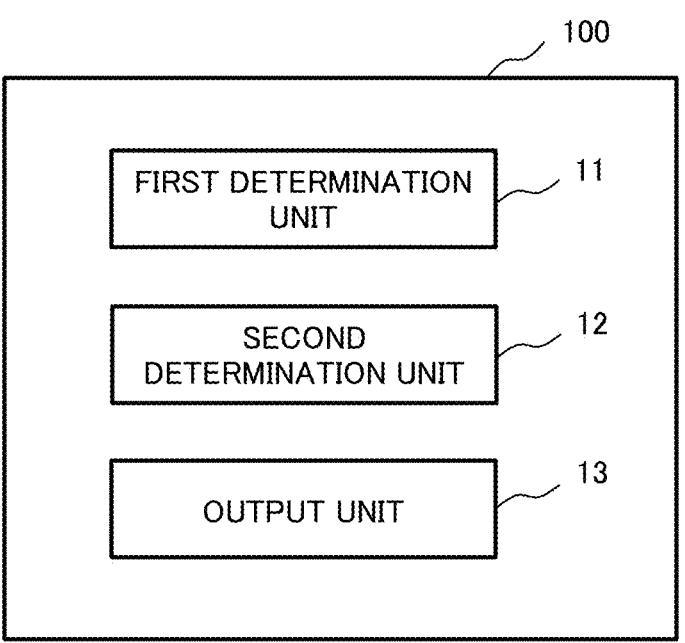
FIG. 1 is a block diagram illustrating a configuration example of a parking lot management system according to the first example embodiment.

FIG. 1 is a block diagram illustrating a configuration of the parking lot management system 100 according to the first example embodiment. The parking lot management system 100 includes a first determination unit 11, a second determination unit 12, and an output unit 13.

The first determination unit 11 determines whether the person detected from the image in which the parking lot is imaged is a parking lot user who has come in by vehicle based on a predetermined condition. The predetermined condition is a condition for distinguishing whether the person is a parking lot user. The parking lot user is a person who parks the vehicle on which the user has ridden into the parking lot. The parking lot users generally get off the vehicle and go to another place. The type of the vehicle is not particularly limited. The vehicle is, for example, an automobile or a bicycle. A person who is not a parking lot user comes to a parking lot or a store on foot, for example.

For example, the first determination unit 11 determines whether a person detected from part of time-series images such as a moving image capturing the parking lot is a parking lot user.

The first determination unit 11 may determine that the person is the parking lot user under a predetermined condition that the person is detected in the parking lot. That is, the first determination unit 11 determines that the person detected in the parking lot is the parking lot user.

The second determination unit 12 determines whether the parking lot user was detected in the store area based on the appearance of the person determined to be the parking lot user and the appearance of the person detected from the image in which the store area is captured. In other words, the second determination unit 12 determines whether the parking lot user and the store user are the same person. The appearance is not particularly limited as long as the appearance can be used for determining whether the person is the same person. For example, the appearance includes a feature such as a face, a body shape, a hairstyle, clothes, a gait, or belongings.

The store area is a reference area for determining that a store is used. The store area includes not only the inside of the store but also, for example, the vicinity of the entrance of the store or a passage leading to the store. At this time, even in a case where the person does not purchase the product, it can be said that the person uses the store. The person detected in the store area is also referred to as a store user. In a case where the store area is set as the pre-register area, the person who has purchased the product can be the store user.

The second determination unit 12 acquires the appearance of the parking lot user and the appearance of the store user. The second determination unit 12 determines whether the parking lot user was detected in the store area by collating the appearance of the parking lot user and the appearance of the store user. The second determination unit 12 determines that the parking lot user is the store user based on, for example, the matching degree of the appearance of the parking lot user and the appearance of the store user. The matching degree increases as the appearance is similar. The second determination unit 12 determines that the parking lot user is detected in the store area in a case where the matching degree of the appearances of the parking lot user and the store user exceeds the threshold value.

For example, the second determination unit 12 may determine whether the store user detected from the image in which the store area is imaged a predetermined time after the image in which the parking lot user is detected is captured is the parking lot user. That is, the second determination unit 12 uses an image in which the store is imaged a predetermined time after the imagine time of the image used to detect the parking lot user, for the collation of the appearance. This is because the parking lot user generally parks the vehicle and uses the store after detection in the parking lot. Alternatively, the second determination unit 12 may make a determination on a person detected from an image in which the parking lot area is imaged a predetermined time after the image in which the store user is detected is captured. This is because the second determination unit 12 may determine whether the store user is a parking lot user when the store user goes home on the vehicle.

The output unit 13 outputs information about the parking lot user based on a result of the determination as to whether the parking lot user was detected in the store area. For example, the output unit 13 changes the timing of outputting the information about the parking lot user based on the result of the determination. Alternatively, the output unit 13 changes the information to be output based on the result of the determination. The information about the parking lot user output by the output unit 13 will be described in detail in the second example embodiment.

The output unit 13 may output information about the parking lot user in a case where the second determination unit 12 determines that the parking lot user is not detected in the store area. For example, in a case where the second determination unit 12 determines that the person is not detected in the store area even after a predetermined time has elapsed since the person is detected in the parking lot, the output unit 13 may output the information about the parking lot user. The output unit 13 may output information about the parking lot user until the parking lot user is detected in the store area.

The output unit 13 may output information about the parking lot user in a case where the second determination unit 12 determines that the parking lot user has been detected in the store area.

Figure 2:
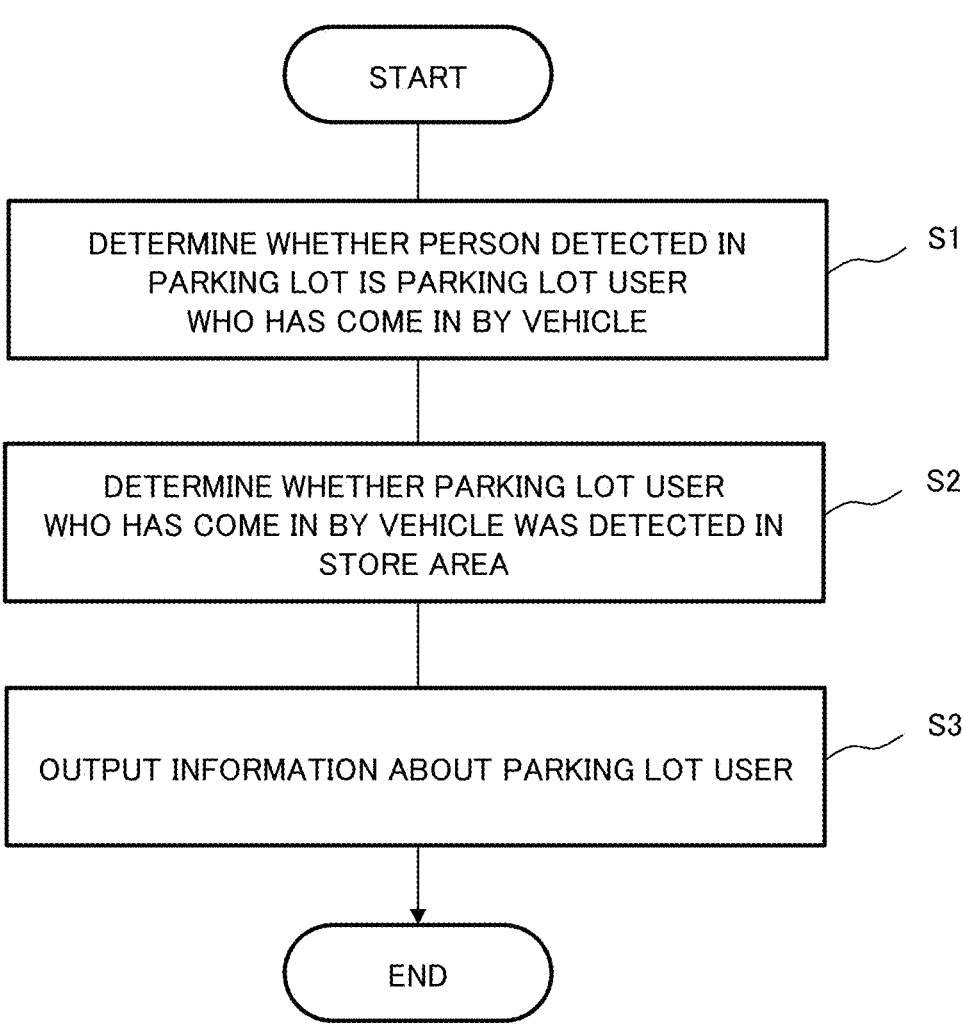
FIG. 2 is a flowchart illustrating an operation example of the parking lot management system according to the first example embodiment.

FIG. 2 is a flowchart illustrating an operation example of the parking lot management system 100 according to an example embodiment. The parking lot management system 100 may start the operation of FIG. 2 in response to detection of a person from an image in which the parking lot is imaged.

The first determination unit 11 determines whether the person detected from the image in which the parking lot is imaged is a parking lot user who has come in by vehicle based on a predetermined condition (step S1). In a case where it is determined that the person is a parking lot user, the parking lot management system 100 executes the next step S2.

The second determination unit 12 determines whether the parking lot user was detected in the store area based on the appearance of the person determined to be the parking lot user and the appearance of the person detected from the image in which the store area is captured (step S2).

Based on the result of the determination as to whether the parking lot user was detected in the store area, the output unit 13 outputs information about the parking lot user (step S3).

According to the first example embodiment, the first determination unit 11 determines whether the person detected from the image in which the parking lot is captured is a parking lot user who has come in by vehicle based on a predetermined condition. The second determination unit 12 determines whether the parking lot user was detected in the store area based on the appearance of the person determined to be the parking lot user and the appearance of the person detected from the image in which the store area is captured. The output unit 13 outputs information about the parking lot user based on a result of the determination as to whether the parking lot user was detected in the store area. Therefore, the parking lot management system 100 can output information to the store clerk or the like according to whether the parking lot user uses the store. Therefore, it is easy for the store clerk to grasp whether the user of the parking lot uses the store.

Second Example Embodiment

Figure 3:
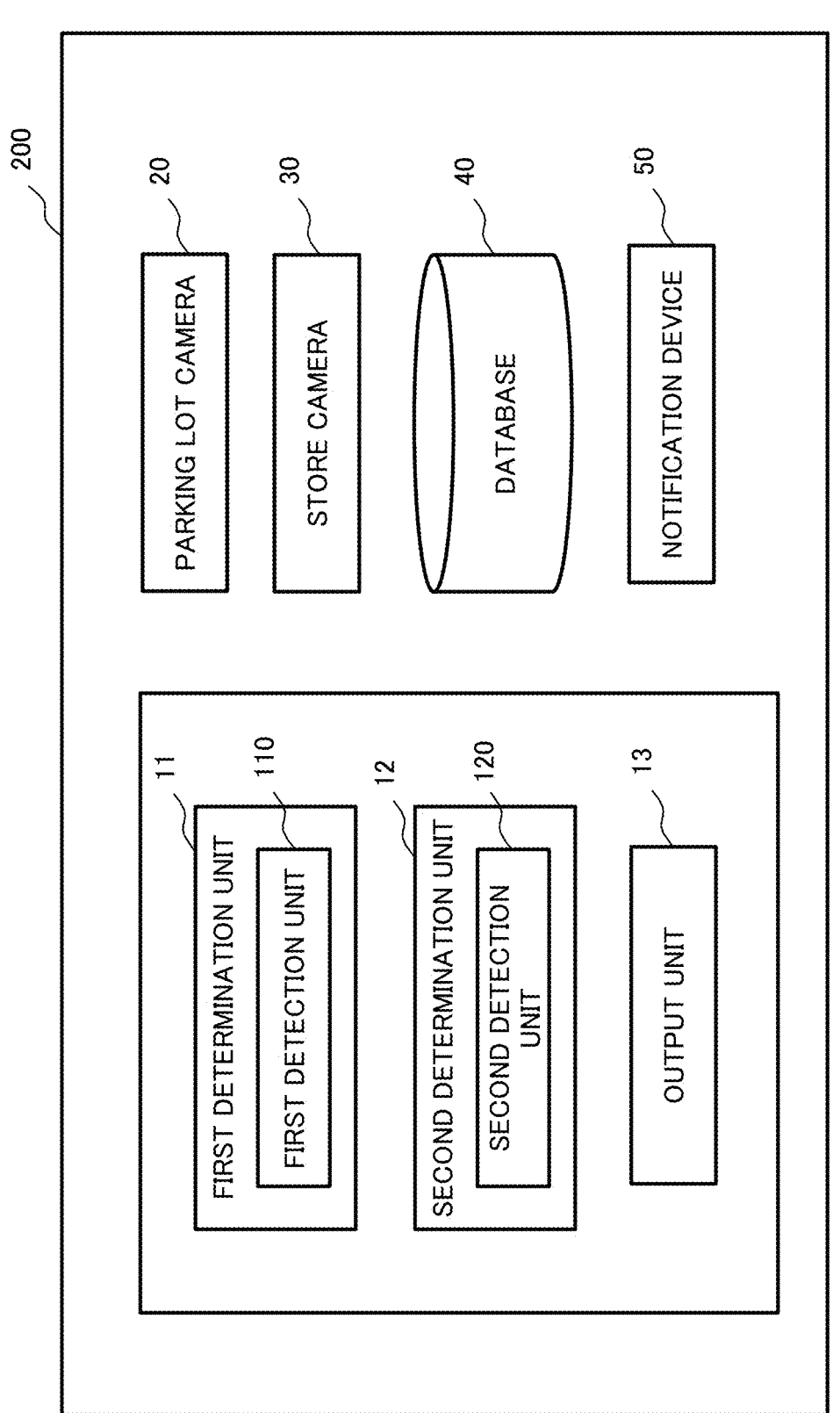
FIG. 3 is a block diagram illustrating a configuration example of a parking lot management system according to the second example embodiment.

FIG. 3 is a block diagram illustrating a configuration of a parking lot management system 200 according to the second example embodiment. As in the parking lot management system 100 according to the first example embodiment, a parking lot management system 200 includes the first determination unit 11, the second determination unit 12, and the output unit 13. Further, the parking lot management system 200 includes a parking lot camera 20, a store camera 30, a database 40, and a notification device 50. In the parking lot management system 200 according to the second example embodiment, a case where the first determination unit 11 includes a first detection unit 110 and the second determination unit 12 includes a second detection unit 120 will be described. In the configuration of the second example embodiment, the description of the configuration similar to that of the first example embodiment is omitted.

The parking lot camera 20 images the parking lot. The parking lot camera 20 is, for example, a monitoring camera of a parking lot. The parking lot camera 20 may be installed on an entrance of a parking lot, a checkout device of a parking lot, or a pole provided in a parking lot. However, the parking lot camera 20 may be installed in the store as long as the parking lot can be imagined.

Store camera 30 captures an image of a store area. The store camera 30 is, for example, a monitoring camera in the store or a camera installed near the entrance of the store.

Figure 4:
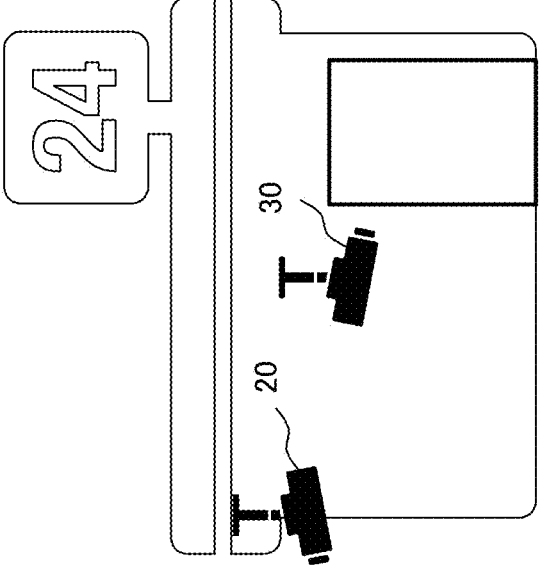
FIG. 4 is a schematic diagram illustrating an installation example of a camera.
Figure 4:
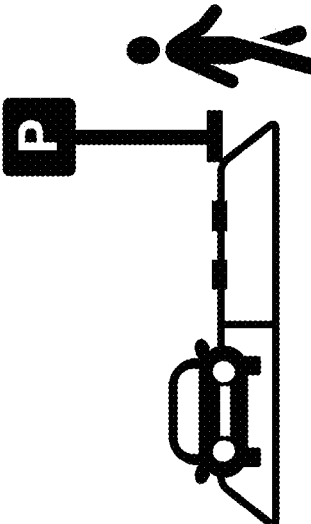

FIG. 4 is a schematic diagram illustrating an installation example of the camera. In FIG. 4, the parking lot camera 20 is installed on an outdoor roof of a store. In FIG. 4, the store camera 30 is installed outdoors and captures an entrance. However, the store camera 30 may be installed indoors. One parking lot camera and one store camera may be provided, or a plurality of parking lot cameras 20 and a plurality of store cameras 30 may be provided.

The database 40 stores the appearance of the person detected by the first detection unit 110. For example, the database 40 stores the appearance of the person determined to be the parking lot user among the persons detected by the first detection unit 110. Furthermore, the database 40 may store the appearance of the person detected by the second detection unit 120.

The first detection unit 110 detects a person from an image in which the parking lot is imaged. For example, the first detection unit 110 acquires an image from the parking lot camera 20. The first detection unit 110 detects a person by performing image recognition on the acquired image. The first detection unit 110 further extracts the appearance of the detected person. The first detection unit 110 may extract the appearance of the person determined to be the parking lot user by the first determination unit 11.

The first determination unit 11 determines whether the person detected from the image in which the parking lot is imaged is a parking lot user who has come in by vehicle based on a predetermined condition. The predetermined condition used by the first determination unit 11 to determine whether the person is a parking lot user may be a condition related to a position where each person is first detected in the parking lot.

For example, the first detection unit 110 determines whether the detected person is the same person as the previously detected person. The first detection unit 110 further determines an area in which the vehicle is parked. In a case where the position where the person is first detected in the parking lot is an area where the vehicle is parked, it is estimated that the person has got off the parked vehicle, and thus, the first determination unit 11 determines that the person is a parking lot user. For example, the first determination unit 11 determines that the person whose position at which the person is first detected in the parking lot is near the entrance of the parking lot is not a parking lot user.

The first detection unit 110 may further detect the vehicle from the acquired image. In a case where the vehicle is detected from the image in which the parking lot is captured, the first determination unit 11 may determine that the person is the parking lot user in a case where the position where the person is first detected is within a predetermined range from the position of the detected vehicle as the predetermined condition. At this time, for example, in a case where the vehicle is not detected within the predetermined range of the position where the person is detected first, the first determination unit 11 determines that the person is not a parking lot user.

The first determination unit 11 may determine that a person detected from an image in which a parking lot is imaged within a predetermined range of the vehicle within a predetermined time from the time when the image in which the vehicle is first detected is imagined is the parking lot user. As a result, the first determination unit 11 can determine that a person who gets off the vehicle within a predetermined time after parking the vehicle is a parking lot user. For example, the first determination unit 11 can prevent a person detected near a vehicle that has been parked for several hours, the person being unrelated to the vehicle, from being erroneously determined as a parking lot user.

The predetermined condition used for the determination by the first determination unit 11 may be a condition related to the direction of walking of the person. A person who walks through a parking lot and goes to a store and a person who parks a vehicle and goes to the store may walk in different directions. Therefore, the first determination unit 11 may determine whether the detected person is the parking lot user based on the walking direction of the person in the parking lot. The first determination unit 11 may determine the walking direction from the orientation of the body detected from the image. The first determination unit 11 may determine the walking direction of the person by determining the walking direction of the person from two or more images.

The first determination unit 11 stores the appearance of the person extracted by the first detection unit 110 in the database 40. For example, the first determination unit 11 instructs the database 40 to store the appearance of the person determined to be the parking lot user.

In addition to the appearance of the person, the first determination unit 11 may store the time when the image in which the person is detected is captured. The first determination unit 11 may be configured to erase the stored information after a predetermined time has elapsed.

The first detection unit 110 may detect a person outside the vehicle. The first detection unit 110 detects, for example, a person whose entire body appears from an image as a person outside the vehicle. The first detection unit 110 may exclude a person on the vehicle from the target whose appearance is extracted.

The first determination unit 11 may determine whether a person outside the vehicle is a parking lot user. For example, the first determination unit 11 may determine whether a person outside the vehicle is a parking lot user based on a position first detected in the parking lot. The first determination unit 11 stores, for example, an appearance related to a person outside the vehicle in the database 40. The appearance of the person outside the vehicle is expected to be easily collated with the appearance of the person detected in the store area as compared with the appearance of the person in the state of being on the vehicle.

The person outside the vehicle is, for example, a person who is walking or standing outside the automobile. The person outside the vehicle may include a person who is pushing a bicycle and walking. That is, the first detection unit 110 may exclude the person riding the bicycle from the target from which the appearance is extracted.

The first determination unit 11 may determine that the vehicle is parked. For example, in a case where the first detection unit 110 detects the vehicle in a predetermined parking space, the first determination unit 11 determines that the vehicle is parked. The first determination unit 11 may determine that the vehicle is parked in a case where the vehicle is detected at the same position in two or more images captured at different times.

As the predetermined condition, the first determination unit 11 may determine that the person is a parking lot user in a case where the position where the person is first detected is within a predetermined range from the position of the vehicle determined to be parked. As the predetermined condition, in a case where the person is detected within a predetermined range of the vehicle within a predetermined time after the vehicle is parked, the first determination unit 11 may determine that the person is a parking lot user.

Even in a case where the performance of the camera is low, the predetermined condition described above can be appropriately set in such a way that the first determination unit 11 can determine whether the person is a parking lot user. In addition, in a case where the performance of the camera is high, the first determination unit 11 may determine that the person is a parking lot user under a predetermined condition that an action of getting off the vehicle or an action of getting on the vehicle is detected. As the getting-off operation and the getting-on operation, for example, the first detection unit 110 detects an operation in which a person opens and closes a door of an automobile, an operation in which the person gets out of the automobile, or an operation in which the person gets in the automobile from one or a plurality of images in which the parking lot is captured.

The second detection unit 120 detects a person from an image in which the store area is captured. For example, the second detection unit 120 acquires an image from the store camera 30. The second detection unit 120 detects a person by performing image recognition on the acquired image.

For example, the second determination unit 12 refers to the database 40 and collates the appearance of the store user with the appearance of the parking lot user.

The second determination unit 12 may determine whether the parking lot user who was no longer detected in the parking lot was detected in the store area. For example, the first detection unit 110 determines whether the detected person is the same person as the previously detected person. The first detection unit 110 recognizes that the detected person is no longer detected. In a case where the first detection unit 110 can determine the position of the exit, the first detection unit 110 may detect that the parking lot user has left the exit of the parking lot as a result of tracking the parking lot user. In general, the parking lot user who has left the exit is not detected in the parking lot. The first determination unit 11 transmits, to the second determination unit 12, recognition that the parking lot user is no longer detected in the parking lot. In a case where the second determination unit 12 determines the parking lot user who is no longer detected in the parking lot, the second determination unit 12 does not collate the appearance of the person in the parking lot, and thus, it is possible to reduce the processing load of the collation.

The second determination unit 12 may lower the criterion for determining whether the parking lot user was detected in the store area for a predetermined time after the parking lot user is no longer detected. The predetermined time is appropriately set according to the time required for moving from the parking lot to the store area. Since a picture taken outdoors and a picture taken indoors have different brightness, it may be difficult to determine the same person. The store user detected in the store area within a predetermined time after the parking lot user is no longer detected in the parking lot is likely to be the same person as the parking lot user. By lowering the criterion for determining that the parking lot user is the same person within a predetermined time after the parking lot user is no longer detected in the parking lot, it is possible to more reliably determine that the parking lot user is detected in the store area.

The second determination unit 12 may determine whether a parking lot user who has parked the vehicle on which the parking lot user has ridden has been detected in the store area. The second determination unit 12 may exclude the parking lot user whose vehicle on which the parking lot user has ridden is no longer detected from the target for determining whether to be detected in the store area. In a case where the vehicle is not parked, the parking lot user is highly likely to have ridden on the vehicle and left the parking lot. Since the person who has left the parking lot is not detected in the store area, the second determination unit 12 determines the parking lot user who has parked the vehicle, so that the processing load of the determination can be reduced.

At this time, the first determination unit 11 determines the vehicle on which the parking lot user has ridden. The first determination unit 11 determines that the same vehicle is parked based on the appearance of the vehicle. For example, the first determination unit 11 determines that a vehicle detected within a predetermined range from a position where a person is detected in the parking lot is a vehicle on which a parking lot user has ridden. The first determination unit 11 may determine that a vehicle detected within a predetermined time from the time when the parking lot user is detected is a vehicle on which the parking lot user has ridden. That is, in a case where two or more vehicles are parked near the detected person, the first determination unit 11 distinguishes between the originally parked vehicle and the newly parked vehicle.

The second determination unit 12 may exclude the parking lot user for whom a predetermined time or more has elapsed after the detection in the parking lot from the target for determining whether the parking lot user is detected in the store area. The predetermined time or longer is appropriately set to such an extent that it can be determined that the parking lot user does not use the store. For example, in a case where the parking lot user is not detected in the store area when three hours or more have elapsed after the parking lot user is detected in the parking lot, it is considered that the person has no intention of using the store. The parking lot user who is not detected in the store area for a long time may illegally leave the vehicle. The second determination unit 12 can reduce the processing load of the determination by excluding the person from the determination target.

The second determination unit 12 may make a determination as to whether the parking lot user was detected in the store area regardless of whether the vehicle on which the person has ridden is an automobile or a bicycle. The second determination unit 12 may determine whether one of a person who has come in by car and a person who has come in by bicycle was detected in the store area. For example, in a case where the parking lot is dedicated to automobiles, the second determination unit 12 determines whether a person who has come in by car was detected in the store area. For example, in a case where the first determination unit 11 can discriminate between a person who has come in by car and a person who has come in by bicycle, the first determination unit 11 may determine that the person who has come in by bicycle is not a parking lot user. In this way, the second determination unit 12 determines whether the person who has come in by car is detected in the store area.

The output unit 13 outputs information about the parking lot user based on a result of the determination as to whether the parking lot user was detected in the store area. The output unit 13 outputs, for example, information about the parking lot user to the notification device 50.

In response to receiving the information about the parking lot user from the output unit 13, the notification device 50 notifies the store clerk or the parking lot user of the information about the parking lot user. The notification device 50 is, for example, a display, a speaker, or a lamp. The notification device 50 may be a terminal operated by a store clerk. The notification device 50 may be installed in a parking lot.

That the output unit 13 causes the notification device 50 to notify the store clerk or the parking lot user of the information is included in that the output unit 13 outputs the information about the parking lot user to the store clerk or the parking lot user.

As an example, the information about the parking lot user is information indicating that a parking lot user not detected in the store area is present. In a case where the second determination unit 12 determines that the parking lot user is not detected in the store area, the output unit 13 outputs to the notification device 50 that a parking lot user not detected in the store area is present. The notification device 50 makes a notification that a parking lot user not detected in the store area is present by display on the display, sound, alarm sound, or lighting of a lamp.

Parking in a free parking lot provided next to a store even though there is no necessity to visit the store is illegal use of the parking lot. The output unit 13 outputs that a parking lot user who has not been detected in the store area is present, so that it is possible to make a notification that there may be a person who is illegally using the parking lot.

As an example, the information about the parking lot user is information for identifying the parking lot user. The information for identifying the parking lot user is information for notifying the store clerk or the parking lot user of a feature of the parking lot user that has not been detected in the store area. In this case, the information for identifying the parking lot user includes, for example, appearance of the parking lot user, the face image, the identification information of the parking space, the vehicle type, and the vehicle registration number of the number plate. The output unit 13 acquires information for identifying the parking lot user from the first determination unit 11 or the second determination unit 12. The first detection unit 110 may recognize the identification information of the parking space, the vehicle type, or the vehicle registration number from the image. The output unit 13 outputs information for identifying the parking lot user to the store clerk, so that the store clerk can grasp a person who may be illegally using the parking lot.

In a case where the parking lot user who is no longer detected in the parking lot is detected again in the parking lot without being detected in the store area, the output unit 13 may output information about the detected parking lot user again. For example, the first detection unit 110 transmits to the second determination unit 12 that the parking lot user is detected again after the parking lot user was no longer detected. The second determination unit 12 determines whether the parking lot user detected in the parking lot again was detected in the store area. Based on the result of the determination by the second determination unit 12 that the parking lot user has not been detected in the store area, the output unit 13 outputs information about the parking lot user detected again to the notification device.

The notification device 50 notifies the store clerk of the presence of a parking lot user not detected in the store area or information for identifying the parking lot user based on the information about the parking lot user detected again, the information being received from the output unit 13. The notification device 50 notifies the store clerk, of the information, so that the store clerk can notify the returning parking lot user of not illegally using the parking lot user.

The notification device 50 may notify the parking lot user of not illegally using the parking lot by a display, a sound, or the like based on the information about the parking lot user detected again, the information being received from the output unit 13.

In order to prevent unauthorized use, a parking lot provided near a store may be coin-parking. As described above, since the notification device 50 makes a notification to the parking lot user who has not been detected in the store area, unauthorized use can be prevented without changing the parking lot to coin-parking.

In another example, the information about the parking lot user is that the person detected in the store area is the parking lot user. For example, in a case where the second determination unit 12 determines that the parking lot user has been detected in the store area, the output unit 13 outputs to the notification device 50 that the person detected in the store area is the parking lot user.

The output unit 13 may output, to the notification device 50, information for identifying the parking lot user detected in the store area as the information about the parking lot user. The information for identifying the parking lot user includes, for example, the appearance of the parking lot user, the face image, and the location in the store. The location in the store may be a table identifier that identifies individual tables at which customers are seated in a restaurant. The output unit 13 acquires information for identifying the parking lot user from the first determination unit 11 or the second determination unit 12.

The notification device 50 notifies the store clerk of the information about the parking lot user, the information being received from the output unit 13. For example, in a case where the parking lot is charged, the store clerk is notified of the information about the parking lot user, so that the store clerk can provide the parking lot user with a parking fee discount ticket. In the restaurant, by notifying the store clerk of the information about the parking lot user, the store clerk can pay attention not to provide alcohol to the person who drives the vehicle. In the pharmacy, the pharmacist is notified of the information about the parking lot user, so that the pharmacist can explain the provision of the medicine requiring attention in driving the vehicle.

In the second example embodiment, the case where the first determination unit 11 and the second determination unit 12 respectively include the first detection unit 110 and the second detection unit 120 is described. However, the first detection unit 110 and the second detection unit 120 may be provided outside the first determination unit 11 and the second determination unit 12, respectively. For example, the first detection unit 110 and the second detection unit 120 may be implemented by a device different from the device that implements the first determination unit 11, the second determination unit 12, and the output unit 13.

The description of each example embodiment ends. Each example embodiment may be modified and used. The modifications will be described below.

Modifications

The output unit 13 may output information about the parking lot user for marketing analysis. In this case, the information about the parking lot user includes, for example, the product purchased by the parking lot user, the attribute of the person, the attribute of the vehicle on which the parking lot user has ridden, the visit time, the time of staying at the store, or the time of use of the parking lot.

The output unit 13 acquires, for example, information about the parking lot user from the first determination unit 11 or the second determination unit 12. The first detection unit 110 may estimate the attribute of the person from an appearance such as a face or a body shape. The attribute of the person includes, for example, age or sex. The first detection unit 110 recognizes the attribute of the vehicle and the time of use of the parking lot. The attributes of the vehicle include a vehicle type, a color, a brand name, and a vehicle name of the vehicle. The vehicle type indicates, for example, whether the vehicle is a normal automobile, a light automobile, a truck, a motorcycle, or a bus. The time of use of the parking lot is, for example, a time from when the vehicle is detected until the vehicle is no longer detected.

The information output by the output unit 13 is analyzed and processed by an any information processing device and displayed for the store manager.

The marketing analysis may be implemented by an information processing device installed in each store together with the parking lot management system 100. In each store, a person is detected from an image and analysis is performed, so that it is not necessary to provide the image to a cloud or the like for analysis. Therefore, it is possible to consider privacy of a captured person. Based on the analyzed information, the manager of the store studies a purchase amount, sales promotion measures such as coupons, design of a parking lot, or the like.

The marketing analysis may be implemented by an information processing system of the head office that manages a plurality of stores. In this case, the parking lot management system 100 transmits information to the information processing system of the head office. The parking lot management system 100 transmits information masked to the system of the head office so as not to identify an individual. For example, the parking lot management system 100 transmits the attribute of the parking lot user. The information analyzed by the system of the head office is used, for example, in studying a store opening plan.

Hardware Configuration

In each of the above-described example embodiments, each component of the parking lot management system 100, 200 represents a block of functional units. Some or all of the components of the parking lot management system 100, 200 may be achieved by an any combination of the computer 500 and a program.

Figure 5:
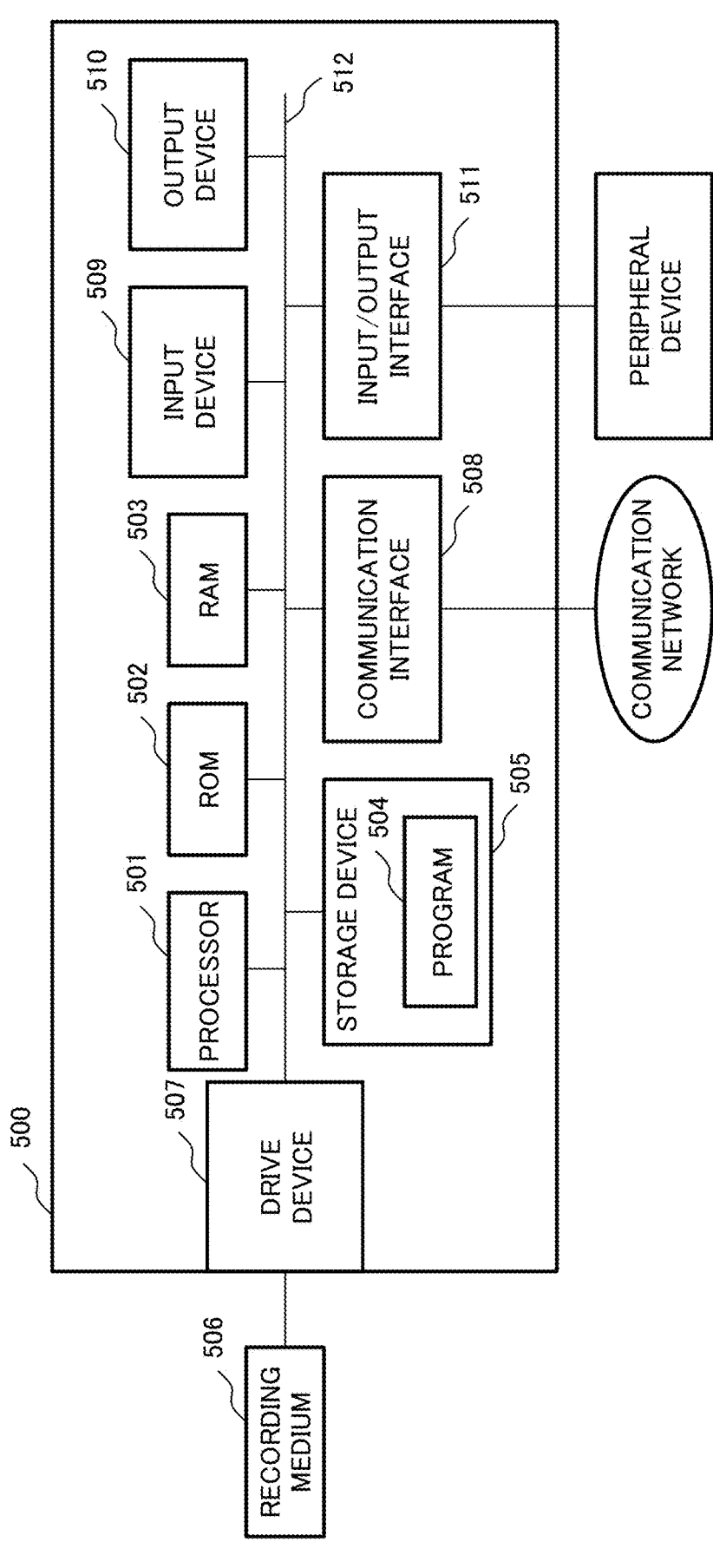
FIG. 5 is a block diagram illustrating an example of a hardware configuration of a computer.

FIG. 5 is a block diagram illustrating an example of a hardware configuration of the computer 500. Referring to FIG. 5, the computer 500 includes, for example, a processor 501, a read only memory (ROM) 502, a random access memory (RAM) 503, a program 504, a storage device 505, a drive device 507, a communication interface 508, an input device 509, an input/output interface 511, and a bus 512.

The processor 501 controls the entire computer 500. Examples of the processor 501 include a central processing unit (CPU) and the like. The number of processors 501 is not particularly limited, and the number of processors 501 is one or more.

The program 504 includes an instruction for implementing each function of the parking lot management system 100, 200. The program 504 is stored in advance in the ROM 502, the RAM 503, and the storage device 505. The processor 501 implements each function of the parking lot management system 100, 200 by executing instructions included in the program 504. The RAM 503 may store data to be processed by each function of the parking lot management system 100, 200.

The drive device 507 reads and writes the recording medium 506. The communication interface 508 provides an interface with a communication network. The input device 509 is, for example, a mouse, a keyboard, or the like, and receives an input of information from an administrator or the like of the store. The output device 510 is, for example, a display, to output (displays) information to a store clerk or an administrator of the store. The input/output interface 511 provides an interface with a peripheral device. The bus 512 connects the components of the hardware. The program 504 may be supplied to the processor 501 via a communication network, or may be stored in the recording medium 506 in advance, read by the drive device 507, and supplied to the processor 501.

The hardware configuration illustrated in FIG. 5 is an example, and other components may be added or some components may not be included.

There are various modifications of the method of achieving the parking lot management system 100, 200. For example, the parking lot management system 100, 200 may be achieved by any combinations of a computer and a program different for each component. A plurality of components included in the parking lot management system 100, 200 may be achieved by any combinations of one computer and a program.

While the present disclosure has been particularly shown and described with reference to example embodiments thereof, the present disclosure is not limited to the above example embodiments. Various modifications that can be understood by those of ordinary skill in the art can be made to the configuration and details of the present disclosure within the scope of the present disclosure. The configurations in the respective example embodiments can be combined with each other without departing from the scope of the present disclosure.

Some or all of the above example embodiments may be described as the following Supplementary Notes, but are not limited to the following.

Supplementary Note 1

A parking lot management system including
a first determination means for determining, based on a predetermined condition, whether a person who has been detected from an image in which a parking lot is imaged is a parking lot user who has come in by vehicle,
a second determination means for determining, based on an appearance of the person who has been determined to be the parking lot user, and an appearance of a person who has been detected from an image in which a store area is imaged, whether the parking lot user was detected in the store area, and

13 an output means for outputting information about the parking lot user based on a result of the determination regarding whether the parking lot user was detected in the store area.

Supplementary Note 2

The parking lot management system according to Supplementary Note 1, wherein
the information about the parking lot user is information indicating that a parking lot user not detected in the store area is present.

Supplementary Note 3

The parking lot management system according to Supplementary Note 2, wherein
the information about the parking lot user is information for identifying the parking lot user not detected in the store area.

Supplementary Note 4

The parking lot management system according to any one of Supplementary Notes 1 to 3, wherein
the output means outputs information indicating that the person detected in the store area is a parking lot user as the information about the parking lot user to a store clerk.

Supplementary Note 5

The parking lot management system according to any one of Supplementary Notes 1 to 4, wherein
the second determination means determines whether the parking lot user who was no longer detected in the parking lot was detected in a store area.

Supplementary Note 6

The parking lot management system according to any one of Supplementary Notes 1 to 5, wherein
in a case where a vehicle is detected within a predetermined range from a position where the person is detected in the parking lot, the first determination means determines that the person is a parking lot user.

Supplementary Note 7

The parking lot management system according to Supplementary Note 6, wherein
in a case where the vehicle is detected from an image in which the parking lot is imagined within a predetermined time from a time when the person is detected in the parking lot, the first determination means determines that the person is a parking lot user.

Supplementary Note 8

The parking lot management system according to any one of Supplementary Notes 1 to 7, wherein
the first determination means further determines that a vehicle on which the parking lot user has ridden is parked, and
in a case where the vehicle is parked, the second determination means determines whether the parking lot user was detected in the store area.

14

Supplementary Note 9

The parking lot management system according to any one of Supplementary Notes 1 to 8, wherein
the first determination means determines whether the person outside the vehicle is a parking lot user.

Supplementary Note 10

The parking lot management system according to Supplementary Note 9, wherein
the first determination means determines whether the person outside the vehicle is a parking lot user based on a position first detected in the parking lot.

Supplementary Note 11

The parking lot management system according to any one of Supplementary Notes 1 to 10, wherein
the first determination means determines, based on a walking direction of the person in the parking lot, whether the person is a parking lot user who has come in by vehicle.

Supplementary Note 12

A parking lot management method including
determining, based on a predetermined condition, whether a person who has been detected from an image in which a parking lot is imaged is a parking lot user who has come in by vehicle,
determining, based on an appearance of the person who has been determined to be the parking lot user, and an appearance of a person who has been detected from an image in which a store area is imaged, whether the parking lot user was detected in the store area, and
outputting information about the parking lot user based on a result of the determination regarding whether the parking lot user was detected in the store area.

Supplementary Note 13

A recording medium that non-transiently records a program for causing a computer to execute the steps of
determining, based on a predetermined condition, whether a person who has been detected from an image in which a parking lot is imaged is a parking lot user who has come in by vehicle,
determining, based on an appearance of the person who has been determined to be the parking lot user, and an appearance of a person who has been detected from an image in which a store area is imaged, whether the parking lot user was detected in the store area, and
outputting information about the parking lot user based on a result of the determination regarding whether the parking lot user was detected in the store area.

REFERENCE SIGNS LIST

100 parking lot management system
11 first determination unit
110 first detection unit
12 second determination unit
120 second detection unit
13 output unit
20 parking lot camera
30 store camera

40 database

50 notification device

The invention claimed is:

1. A parking lot management system comprising:

at least one memory configured to store instructions; and at least one processor configured to execute the instructions to:

determine, based on a predetermined condition, whether a person who has been detected from an image in which a parking lot is imaged is a parking lot user who has come in by vehicle;

determine, based on a matching degree between an appearance of the person who has been determined to be the parking lot user, and an appearance of a person who has been detected from an image in which a store area is imaged, that the parking lot user was detected in the store area when the matching degree exceeds a threshold;

lower the threshold for the matching degree for a predetermined time after the parking lot user is no longer detected in the parking lot; and output information about the parking lot user based on a result of the determination regarding whether the parking lot user was detected in the store area.

2. The parking lot management system according to claim 1, wherein the information about the parking lot user is information indicating that a parking lot user not detected in the store area is present.

3. The parking lot management system according to claim 2, wherein the information about the parking lot user is information for identifying the parking lot user not detected in the store area.

4. The parking lot management system according to claim 1, wherein the at least one processor is further configured to execute the instructions to:

output information indicating that the person detected in the store area is a parking lot user as the information about the parking lot user to a store clerk.

5. The parking lot management system according to claim 1, wherein the at least one processor is further configured to execute the instructions to:

determine whether the parking lot user who was no longer detected in the parking lot was detected in a store area.

6. The parking lot management system according to claim 1, wherein the at least one processor is further configured to execute the instructions to:

in a case where a vehicle is detected within a predetermined range from a position where the person is detected in the parking lot, determine that the person is a parking lot user.

7. The parking lot management system according to claim 6, wherein the at least one processor is further configured to execute the instructions to:

in a case where the vehicle is detected from an image in which the parking lot is imagined within a predetermined time from a time when the person is detected in the parking lot, determine that the person is a parking lot user.

8. The parking lot management system according to claim 1, wherein the at least one processor is further configured to execute the instructions to:

determine that a vehicle on which the parking lot user has ridden is parked, and in a case where the vehicle is parked, determine whether the parking lot user was detected in the store area.

9. The parking lot management system according to claim 1, wherein the at least one processor is further configured to execute the instructions to:

determine whether the person outside the vehicle is a parking lot user.

10. The parking lot management system according to claim 9, wherein the at least one processor is further configured to execute the instructions to:

determine whether the person outside the vehicle is a parking lot user based on a position first detected in the parking lot.

11. The parking lot management system according to claim 1, wherein the at least one processor is further configured to execute the instructions to:

determine, based on a walking direction of the person in the parking lot, whether the person is a parking lot user who has come in by vehicle.

12. A parking lot management method comprising:

determining, based on a predetermined condition, whether a person who has been detected from an image in which a parking lot is imaged is a parking lot user who has come in by vehicle;

determining, based on a matching degree between an appearance of the person who has been determined to be the parking lot user, and an appearance of a person who has been detected from an image in which a store area is imaged, that the parking lot user was detected in the store area when the matching degree exceeds a threshold;

lowering the threshold for the matching degree for a predetermined time after the parking lot user is no longer detected in the parking lot; and outputting information about the parking lot user based on a result of the determination regarding whether the parking lot user was detected in the store area.

13. A non-transitory recording medium that records a program for causing a computer to execute the steps of:

determining, based on a predetermined condition, whether a person who has been detected from an image in which a parking lot is imaged is a parking lot user who has come in by vehicle;

determining, based on a matching degree between an appearance of the person who has been determined to be the parking lot user, and an appearance of a person who has been detected from an image in which a store area is imaged, that the parking lot user was detected in the store area when the matching degree exceeds a threshold;

lowering the threshold for the matching degree for a predetermined time after the parking lot user is no longer detected in the parking lot; and outputting information about the parking lot user based on a result of the determination regarding whether the parking lot user was detected in the store area.

14. The parking lot management system according to claim 1, wherein the parking lot and the store area have different lighting conditions.

15. The parking lot management system according to claim 14, wherein the parking lot is located outdoors, and the store area is located inside a building.

* * * * *